(12) United States Patent
Loose et al.

(10) Patent No.: US 7,110,893 B2
(45) Date of Patent: Sep. 19, 2006

(54) METHOD AND APPARATUS FOR MEASURING A PARAMETER OF A FLUID FLOWING WITHIN A PIPE USING AN ARRAY OF SENSORS

(75) Inventors: Douglas H. Loose, Southington, CT (US); Allen R. Davis, Falls Church, VA (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/964,044

(22) Filed: Oct. 12, 2004

(65) Prior Publication Data

US 2005/0125166 A1     Jun. 9, 2005

Related U.S. Application Data

(60) Provisional application No. 60/510,758, filed on Oct. 9, 2003, provisional application No. 60/510,789, filed on Oct. 9, 2003, provisional application No. 60/510,767, filed on Oct. 9, 2003, provisional application No. 60/510,768, filed on Oct. 9, 2003.

(51) Int. Cl.
    *G06F 19/00* (2006.01)

(52) U.S. Cl. .......................... 702/48; 702/45; 702/49; 73/861.06

(58) Field of Classification Search .................. 702/45, 702/48, 49
    See application file for complete search history.

(56) References Cited

U.S. PATENT DOCUMENTS

| 4,048,853 A | 9/1977 | Smith et al. ............. 73/861.25 |
| 4,080,837 A | 3/1978 | Alexander et al. ......... 73/61.45 |
| 4,248,085 A | 2/1981 | Coulthard ................ 73/861.06 |
| 4,445,389 A | 5/1984 | Potzick et al. ........... 73/861.27 |
| 4,896,540 A | 1/1990 | Shakkottai et al. ....... 73/861.02 |
| 5,040,415 A | 8/1991 | Barkhoudarian .......... 73/861.03 |
| 5,083,452 A | 1/1992 | Hope ........................ 73/61 R |
| 5,218,197 A | 6/1993 | Carroll ................... 250/227.19 |
| 5,285,675 A | 2/1994 | Colgate et al. ............. 73/23.2 |
| 5,367,911 A | 11/1994 | Jewell et al. ............ 73/861.08 |

(Continued)

FOREIGN PATENT DOCUMENTS

WO     WO 93/14382     7/1993

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—John Barlow
*Assistant Examiner*—Stephen J Cherry

(57) ABSTRACT

Various methods are described which increase the efficiency and accuracy of a signal processor in determining parameters of a fluid using signals output by a spatial array of sensors disposed along a pipe. In one aspect, parameters used for calculating the temporal Fourier transform of the pressure signals, specifically the amount or duration of the data that the windowing function is applied to and the temporal frequency range, are adjusted in response to the determined parameter. In another aspect, an initialization routine estimates flow velocity so the window length and temporal frequency range can be initially set prior to the full array processing. In another aspect, the quality of one or more of the parameters is determined and used to gate the output of the apparatus in the event of low confidence in the measurement and/or no flow conditions. In another aspect, a method for determining a convective ridge of the pressure signals in the k-ω plane is provided.

46 Claims, 9 Drawing Sheets

U.S. PATENT DOCUMENTS

| | | | |
|---|---|---|---|
| 5,398,542 A | 3/1995 | Vasbinder | 73/40.5 |
| 5,524,475 A | 6/1996 | Kolpak et al. | 73/19.03 |
| 5,526,844 A | 6/1996 | Kamen et al. | 137/614.11 |
| 5,591,922 A | 1/1997 | Segeral et al. | 73/861.04 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,151,958 A | 11/2000 | Letton et al. | 73/61.79 |
| 6,202,494 B1 | 3/2001 | Riebel et al. | 73/861.29 |
| 6,354,147 B1 | 3/2002 | Gysling et al. | 73/61.79 |
| 6,378,357 B1 | 4/2002 | Han et al. | 73/54.41 |
| 6,435,030 B1 | 8/2002 | Gysling et al. | 73/587 |
| 6,463,813 B1 | 10/2002 | Gysling | 73/862.59 |
| 6,536,291 B1 | 3/2003 | Gysling et al. | 73/861.42 |
| 6,550,342 B1 | 4/2003 | Croteau et al. | 73/800 |
| 6,587,798 B1 | 7/2003 | Kersey et al. | 702/50 |
| 6,601,458 B1 | 8/2003 | Gysling et al. | 73/861.04 |
| 6,609,069 B1 | 8/2003 | Gysling | 702/48 |
| 6,691,584 B1 | 2/2004 | Gysling et al. | 73/861.42 |
| 6,732,575 B1 | 5/2004 | Gysling et al. | 73/61.79 |
| 6,782,150 B1 | 8/2004 | Davis et al. | 385/12 |
| 6,813,962 B1 | 11/2004 | Gysling et al. | 73/861.26 |
| 6,837,098 B1 | 1/2005 | Gysling et al. | 73/61.79 |
| 2002/0123852 A1 | 9/2002 | Gysling et al. | |
| 2002/0129662 A1 | 9/2002 | Gylsing et al. | |
| 2003/0136186 A1 | 7/2003 | Gysling et al. | |
| 2003/0154036 A1 | 8/2003 | Gylsing et al. | |
| 2004/0016284 A1 | 1/2004 | Gysling et al. | |

FOREIGN PATENT DOCUMENTS

| | | |
|---|---|---|
| WO | WO 99/067629 | 12/1999 |

OTHER PUBLICATIONS

"Two Decades of Array Signal Processing Research", The Parametric Approach, H. Krim and M. Viberg, IEEE Signal Processing Magazine, Jul., 1996, pp. 67-94.

"Development of an array of pressure sensors with PVDF film, Experiments in Fluids 26", Jan. 8, 1999, Springer-Verlag.

a) log scale    b) linear scale a) log sum    b) linear sum

METHOD AND APPARATUS FOR MEASURING A PARAMETER OF A FLUID FLOWING WITHIN A PIPE USING AN ARRAY OF SENSORS

CROSS-REFERENCE TO RELATED PATENT APPLICATIONS

The present application claims the benefit of U.S. Provisional Patent Application No. 60/510,758, filed Oct. 9, 2003, U.S. Provisional Patent Application No. 60/510,789, filed Oct. 9, 2003, U.S. Provisional Patent Application No. 60/510,767, filed Oct. 9, 2003, and U.S. Provisional Patent Application No. 60/510,768, filed Oct. 9, 2003, each of which is incorporated by reference herein in its entirety.

TECHNICAL FIELD

This invention relates to a method and apparatus for measuring at least one parameter of a fluid flowing within a pipe. More specifically, this invention relates to a method and apparatus for measuring a parameter of a fluid flowing within a pipe using an array of sensors.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of fluids in an industrial flow process. Such physical parameters may include, for example, volumetric flow rate, composition, consistency, density, and mass flow rate.

One such sensing technology is described in commonly-owned U.S. Pat. No. 6,609,069 to Gysling, entitled "Method and Apparatus for Determining the Flow Velocity Within a Pipe", which is incorporated herein by reference. The '069 patent describes a method and corresponding apparatus for measuring the flow velocity of a fluid in an elongated body (pipe) by sensing vortical disturbances convecting with the fluid. The method includes the steps of: providing an array of at least two sensors disposed at predetermined locations along the elongated body, each sensor for sampling the pressure of the fluid at the position of the sensor at a predetermined sampling rate; accumulating the sampled data from each sensor at each of a number of instants of time spanning a predetermined sampling duration; and constructing from the accumulated sampled data at least a portion of a so called k-ω plot, where the k-ω plot is indicative of a dispersion relation for the propagation of acoustic pressures emanating from the vortical disturbances. The method also includes the steps of: identifying a convective ridge in the k-ω plot; determining the orientation of the convective ridge in the k-ω plot; and determining the flow velocity based on a predetermined correlation of the flow velocity with the slope of the convective ridge of the k-ω plot.

Another such sensing technology is described in commonly-owned U.S. Pat. Nos. 6,354,167 and 6,732,575 to Gysling et. al, both of which are incorporated by reference herein in their entirety. The '167 and '575 patents describe a spatial array of acoustic pressure sensors placed at predetermined axial locations along a pipe. The pressure sensors provide acoustic pressure signals to signal processing logic which determines the speed of sound of the fluid (or mixture) in the pipe using any of a number of acoustic spatial array signal processing techniques with the direction of propagation of the acoustic signals along the longitudinal axis of the pipe. The speed of sound is provided to logic, which calculates the percent composition of the mixture, e.g., water fraction, or any other parameter of the mixture, or fluid, that is related to the sound speed. The logic may also determine the Mach number of the fluid.

Such sensing technologies are effective in determining various parameters of a fluid flow within a pipe. However, as with any computationally complex process, there remains a desire to increase computational efficiency and accuracy.

SUMMARY OF THE INVENTION

The above-described and other needs are met by an apparatus, method, and storage medium of the present invention, wherein a parameter of a fluid passing through a pipe is measured using a spatial array of at least two sensors disposed at different axial locations along the pipe. Each of the pressure sensors provides a time-domain signal indicative of unsteady pressure within the pipe at a corresponding axial location of the pipe. The time-domain signal from each pressure sensor is divided into a plurality of windowed sections using a window of duration D, and the plurality of windowed sections are transformed into a plurality of frequency spectra. The windowed sections may be overlapping. The plurality of frequency spectra are averaged to provide a second signal indicative of the frequency spectrum of at least a portion of the time-domain signal, and this second signal is transformed into the k-ω domain. A slope of at least one ridge in the k-ω plane is determined and, using this slope, a parameter of the fluid is determined. The parameter of the fluid may include at least one of: velocity of the fluid and speed of sound in the fluid.

In one aspect of the invention, the duration D of the window is adjusted in response to the parameter of the fluid. In one embodiment, the duration D is determined as a function of an aperture length of the spatial array of at least two sensors. For example, the duration D may be determined as:

$$D = C(\text{Aperture})/u$$

where C is a constant, Aperture is the aperture length of the spatial array, and u is a mean flow velocity of the fluid.

In another aspect of the invention, a temporal frequency range of the plurality of frequency spectra is adjusted in response to the parameter of the fluid. In one embodiment, the maximum and minimum frequency limits defining the temporal frequency range are determined as:

$$f_{min} = C_{min} u / \Delta x$$

$$f_{max} = C_{max} u / \Delta x$$

where $f_{min}$ and $f_{max}$ are the maximum and minimum frequency limits, respectively, $C_{min}$ and $C_{max}$ are constants, and $\Delta x$ is a spacing between sensors in the spatial array.

In any of the embodiments described herein, the at least two pressure sensors may be selected from a group consisting of: piezoelectric, piezoresistive, strain gauge, PVDF, optical sensors, ported ac pressure sensors, accelerometers, velocity sensors, and displacement sensors. In various embodiments, the at least two pressure sensors are wrapped around at least a portion of the pipe and do not contact the fluid.

The foregoing and other objects, and features of the present invention will become more apparent in light of the following detailed description of exemplary embodiments thereof.

BRIEF DESCRIPTION OF THE DRAWINGS

Referring now to the drawing wherein like items are numbered alike in the various Figures.

DETAILED DESCRIPTION

As described in U.S. patent applications Ser. Nos. 10/007,749, 10/349,716, and 10/376,427, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process.

Figure 1:
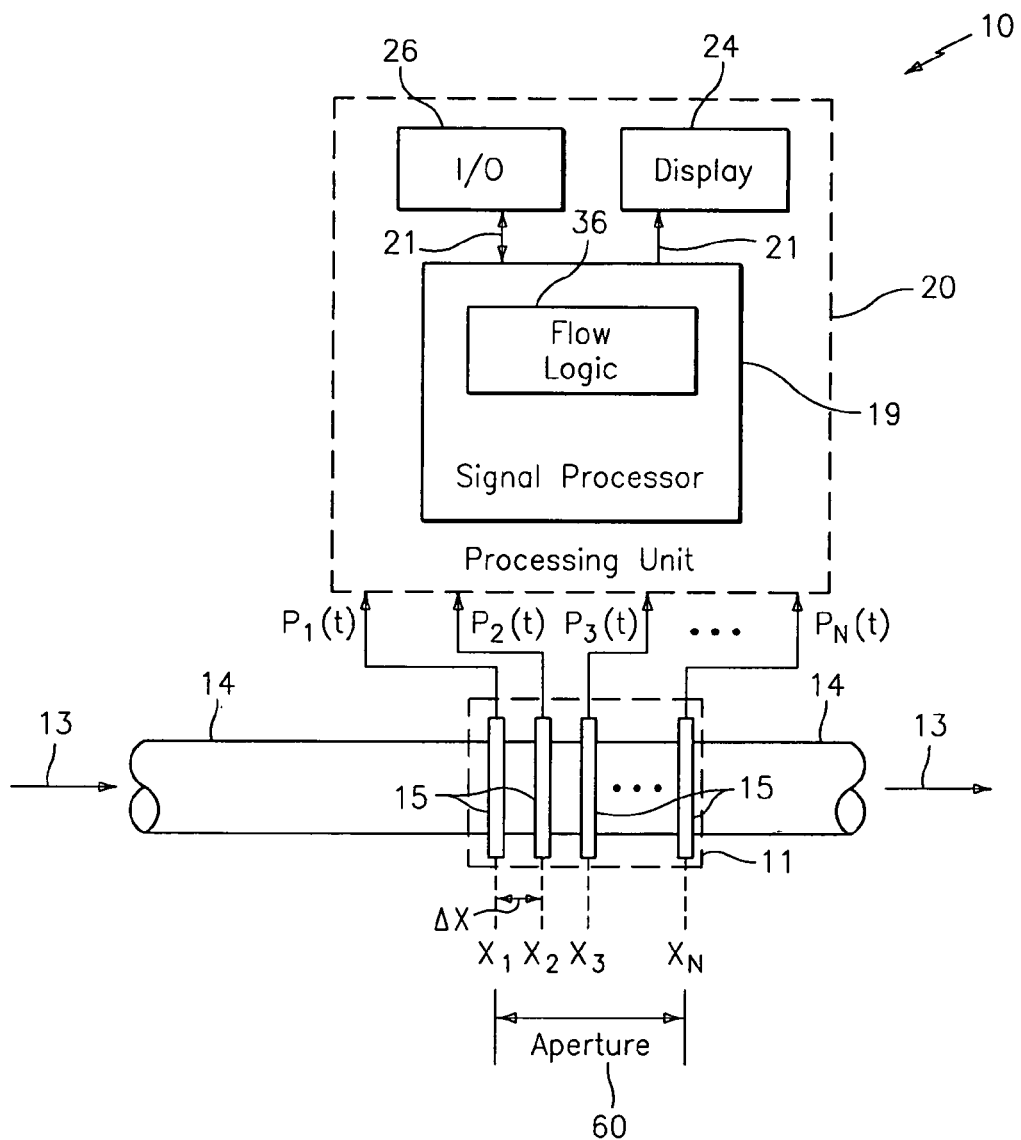
FIG. 1 is schematic diagram of an apparatus for determining at least one parameter associated with a fluid flowing in a pipe in accordance with various embodiments of the present invention.

Referring to FIG. 1, an apparatus 10 for measuring at least one parameter associated with a fluid 13 flowing within a pipe 14 is shown. The parameter of the fluid may include, for example, at least one of: velocity of the fluid 13, speed of sound in the fluid 13, density of the fluid 13, volumetric flow rate of the fluid 13, mass flow rate of the fluid 13, composition of the fluid 13, entrained air in the fluid 13, consistency of the fluid 13, and size of particles in the fluid 13. The fluid 13 may be a single or multiphase fluid flowing through a duct, conduit or other form of pipe 14.

The apparatus 10 includes a spatial array 11 of at least two pressure sensors 15 disposed at different axial locations $x_1 \ldots x_N$ along the pipe 14. Each of the pressure sensors 15 provides a pressure signal P(t) indicative of unsteady pressure within the pipe 14 at a corresponding axial location $x_1 \ldots x_N$ of the pipe 14. A signal processor 19 receives the pressure signals $P_1(t) \ldots P_N(t)$ from the pressure sensors 15 in the array 11, determines the parameter of the fluid 13 using pressure signals from selected ones of the pressure sensors 15, and outputs the parameter as a signal 21. The signal processor 19 applies array-processing techniques to the pressure signals $P_1(t) \ldots P_N(t)$ to determine the velocity, speed of sound of the fluid 13, and/or other parameters of the fluid 13. As will be described in further detail hereinafter, various enhancements are made to the array-processing techniques to increase the efficiency and accuracy of the signal processor 19 in determining the parameters of the fluid 13. In one aspect, the parameters used for calculating the temporal Fourier transform of the pressure signals $P_1(t) \ldots P_N(t)$, specifically the amount or duration of the data that a windowing function is applied to (the window length or snapshot) and a temporal frequency range, are adjusted in response to the determined fluid 13 parameter. In another aspect, an initialization routine estimates the flow velocity so the window length and temporal frequency range can be initially set prior to the full array processing. In another aspect, the quality of one or more of the fluid parameters is determined and used to gate the output of the apparatus 10 in the event of low confidence in the measurement and/or no flow conditions. In another aspect, a method for determining a convective ridge of the pressure signals $P_1(t) \ldots P_N(t)$ in the k-ω plane is provided. While each of these enhancements are described herein as being implemented together, it is contemplated that any one or more of these enhancements may be employed individually, or in various combinations, without one or more of the others.

While the apparatus 10 is shown as including four pressure sensors 15, it is contemplated that the array 11 of pressure sensors 15 includes two or more pressure sensors 15, each providing a pressure signal P(t) indicative of unsteady pressure within the pipe 14 at a corresponding axial location X of the pipe 14. For example, the apparatus may include 2, 3, 4, 5, 6, 7, 8, 9, 10, 11, 12, 13, 14, 15, 16, 17, 18, 19, 20, 21, 22, 23, or 24 pressure sensors 15. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desire update rate of the output parameter provided by the apparatus 10.

The signals $P_1(t) \ldots P_N(t)$ provided by the pressure sensors 15 in the array 11 are processed by the signal processor 19, which may be part of a larger processing unit 20. For example, the signal processor 19 may be a microprocessor and the processing unit 20 may be a personal computer or other general purpose computer. It is contemplated that the signal processor 19 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

To determine the one or more parameters 21 of the flow process, the signal processor 19 applies the data from the selected pressure sensors 15 to flow logic 36 executed by signal processor 19. The flow logic 36 is described in further detail hereinafter.

The signal processor 19 may output the one or more parameters 21 to a display 24 or another input/output (I/O) device 26. The I/O device 26 also accepts user input parameters 48 as may be necessary for the flow logic 36 and diagnostic logic 38. The I/O device 26, display 24, and signal processor 19 unit may be mounted in a common housing, which may be attached to the array 11 by a flexible cable, wireless connection, or the like. The flexible cable may also be used to provide operating power from the processing unit 20 to the array 11 if necessary.

The pressure sensors 15 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor and the pipe 14. The sensors 15 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 14. If desired, for certain applications, gratings may be detached from (or strain or acoustically isolated from) the pipe 14 if desired. It is also within the scope of the present invention that any other strain sensing technique may be used to measure the variations in strain in the pipe 14, such as highly sensitive piezoelectric, electronic or electric, strain gages attached to or embedded in the pipe 14.

In various embodiments of the present invention, a piezoelectronic pressure transducer may be used as one or more of the pressure sensors and it may measure the unsteady (or dynamic or ac) pressure variations inside the pipe 14 by measuring the pressure levels inside the pipe. In one embodiment of the present invention, the sensors 14 comprise pressure sensors manufactured by PCB Piezotronics of Depew, N.Y. For example, in one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The pressure sensors 15 may incorporate a built-in MOSFET microelectronic amplifier to convert the high-impedance charge output into a low-impedance voltage signal. The sensors 15 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore the present invention contemplates that each of the pressure sensors 15 may include a piezoelectric sensor that provides a piezoelectric material to measure the unsteady pressures of the fluid 13. The piezoelectric material, such as the polymer, polarized fluoropolymer, PVDF, measures the strain induced within the process pipe 14 due to unsteady pressure variations within the fluid 13. Strain within the pipe 14 is transduced to an output voltage or current by the attached piezoelectric sensors 15.

The PVDF material forming each piezoelectric sensor 15 may be adhered to the outer surface of a steel strap that extends around and clamps onto the outer surface of the pipe 14. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140 C) (co-polymers)

FLOW LOGIC

Figure 2:
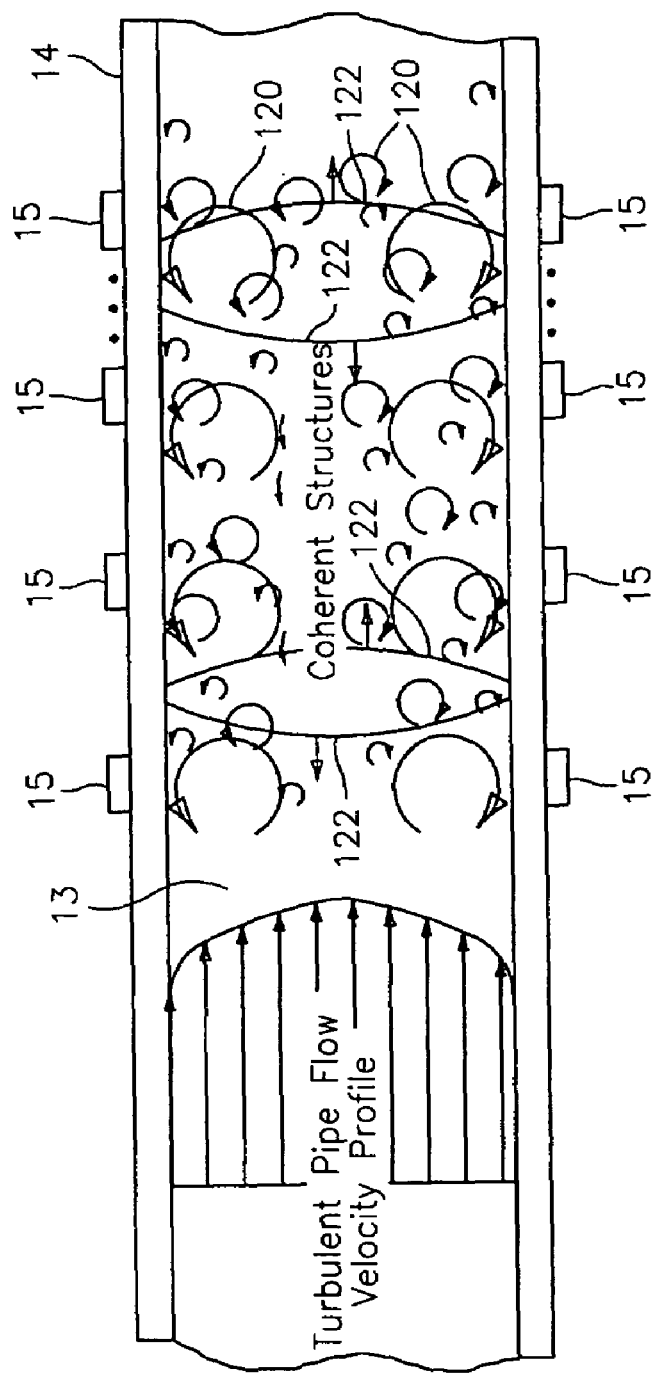
FIG. 2 is a cross-sectional view of a pipe having coherent structures therein.

As previously described with reference to FIG. 1, the array 11 of at least two sensors 15 located at two locations $x_1, x_2$ axially along the pipe 14 sense respective stochastic signals propagating between the sensors 15 within the pipe 14 at their respective locations. Each sensor 15 provides a signal indicating an unsteady pressure at the location of each sensor 15, at each instant in a series of sampling instants. One will appreciate that the array 11 may include more than two sensors 15 distributed at locations $x_1 \ldots x_N$. The pressure generated by the convective pressure disturbances (e.g., eddies 120, see FIG. 2) may be measured through strain-based sensors 15 and/or pressure sensors 15. The sensors 15 provide analog pressure time-varying signals $P_1(t), P_2(t), P_3(t) \ldots P_N(t)$ to the signal processor 19, which in turn applies selected ones of these signals $P_1(t), P_2(t), P_3(t), \ldots P_N(t)$ to the flow logic 36.

Figure 3:
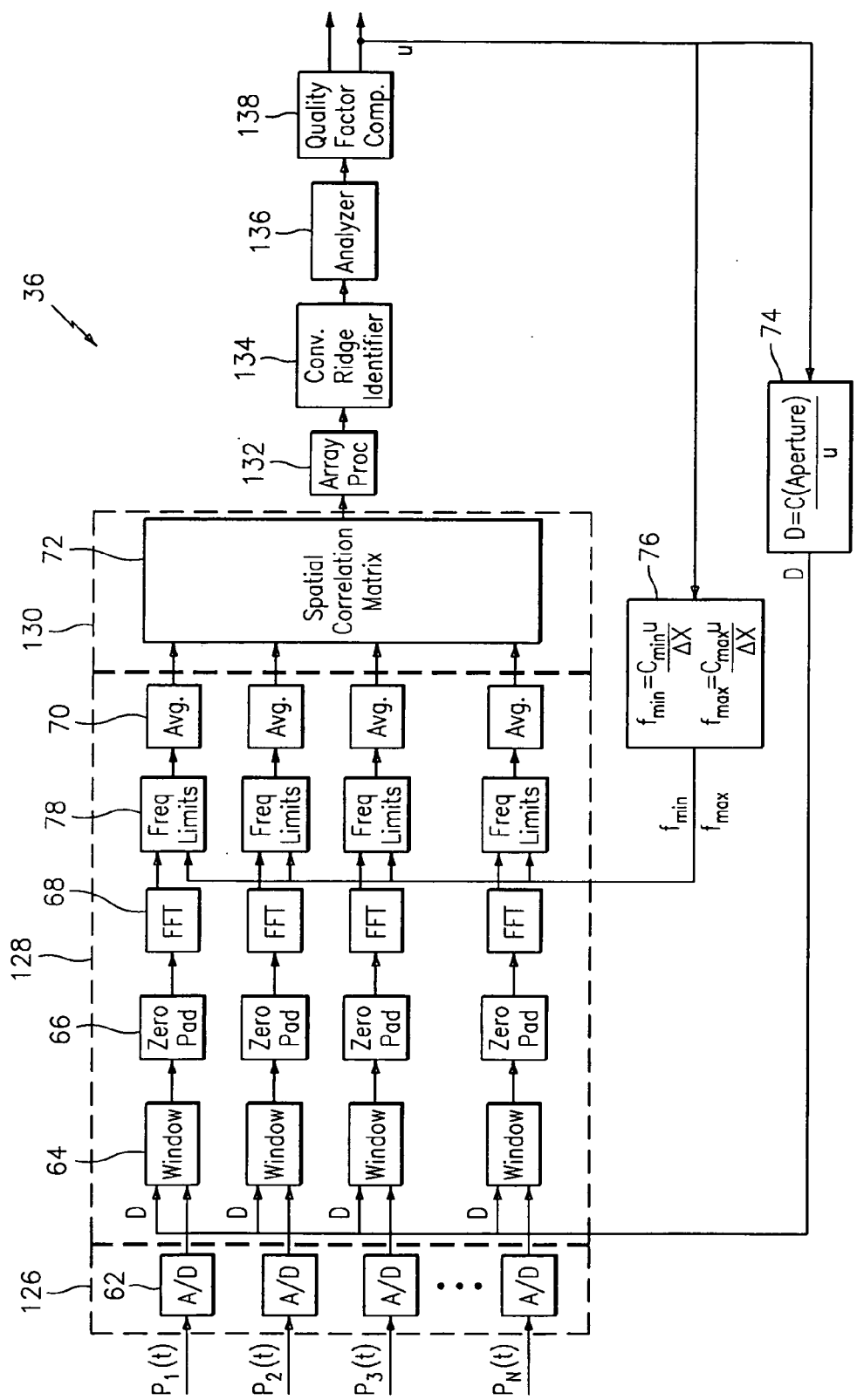
FIG. 3 is a block diagram of a first embodiment of a flow logic used in the apparatus of the present invention.

Referring to FIG. 3, an example of flow logic 36 is shown. As shown in FIG. 3, the signal processor 19 may include a data acquisition unit 126 that converts the analog signals $P_1(t) \ldots P_N(t)$ to respective digital signals and provides the digital signals $P_1(t) \ldots P_N(t)$ to fast Fourier transform (FFT) logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals.

A data accumulator 130 accumulates the frequency signals $P_1(\omega) - P_N(\omega)$ over a sampling interval, and provides the data to an array processor 132, which performs a spatial-temporal (two-dimensional) transform of the sensor data, from the xt domain to the k-ω domain, and then calculates the power in the k-ω plane, as represented by a k-ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi f$.

Figure 4:
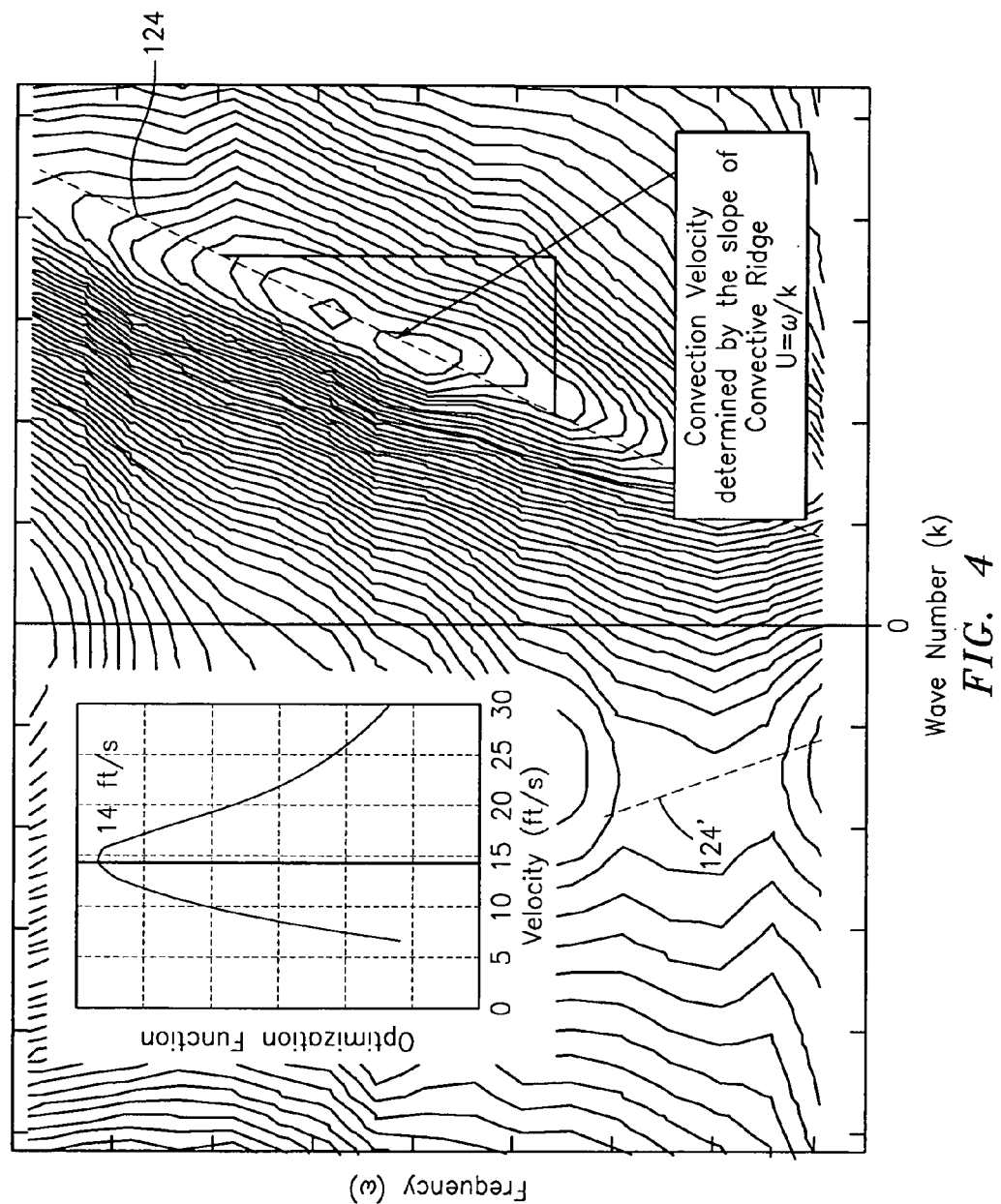
FIG. 4 is a k-ω plot of data processed from an apparatus embodying the present invention that illustrates slope of the convective ridge, and a plot of the optimization function of the convective ridge.

Once the power in the k-ω plane is determined, a ridge identifier 134 uses one or another feature extraction method to determine the location and orientation (slope) of any convective or acoustic ridge 124 present in the k-ω plane. In the case of suitable turbulent eddies 120 (see FIG. 2) being present, the power in the k-ω plane shown in a k-ω plot of FIG. 4 shows a convective ridge 124. The convective ridge 124 represents the concentration of a stochastic parameter that convects with the flow and is a mathematical manifestation of the relationship between the spatial variations and temporal variations described above. Such a plot will indicate a tendency for k-ω pairs to appear more or less along the ridge (line) 124 with some slope, the slope indicating the flow velocity.

More specifically, convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 (FIG. 2) are distributed over a range of length scales and hence temporal frequencies.

An analyzer 136 examines the convective ridge information including the convective ridge orientation (slope). Assuming the straight-line dispersion relation given by $k=\omega/u$, the analyzer 136 determines the flow velocity, Mach number and/or volumetric flow, which are output as parameters 21. The volumetric flow is determined by multiplying the cross-sectional area of the inside of the pipe with the velocity of the process flow.

After the analyzer 136 outputs the parameters 21, the quality of one or more of the parameters 21 may be evaluated using a quality factor comparator 138, which gates the output of the signal processor 36 in the event of low confidence in the measurement and/or no flow conditions. The operation of the quality factor comparator 138 and various other components of the signal processor 36 are described in further detail hereinafter.

Regarding array processor 132, the prior art teaches many algorithms of use in spatially and temporally decomposing a signal from a phased array of sensors, and the present invention is not restricted to any particular algorithm. One particular array-processing algorithm used by the array processor 32 is the Minimum Variance Distortionless Response beamformer (aka MVDR or Capon). While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Where array processor 132 employs array-processing algorithms such as the MVDR algorithm, one input to the array processor 132 is the spatial correlation matrix, which in matrix notation can be described as the outer product of the sensor Fourier transform vector (the Fourier transform of each sensor at a given frequency) with itself. Stated another way, the spatial correlation matrix is an N×N matrix (where N is the number of sensors) that contains the magnitude and phase relationship of all combinations of sensors 15 within the array 11 at a given frequency. In the embodiment of FIG. 3, the data accumulator 130 generates the spatial correlation matrix as indicated at block 72.

To create the spatial correlation matrix, first the FFT logic 128 calculates the temporal Fourier transform of the data for each sensor 15 as indicated at block 68. The Fourier transform or more specifically the fast Fourier transform algorithm is a well-known and powerful signal processing tool that transforms data from the time-domain to the frequency-domain and thus describes a given signal as a sum of scaled sinusoids.

The results of the FFT are greatly improved if certain smoothing of the data prior to applying the transform is done and by averaging multiple transforms. That is, rather than applying the transform to the entire set of data received from each sensor 15, it is generally better to break the data received from each sensor 15 into sections (frames) using a shorter duration window, compute the transform of each windowed section and then average all the resulting transforms. However, when deciding the length of the window and how much averaging to do, a tradeoff arises between frequency resolution and the amount of averaging. For a given amount of data, the frequency resolution decreases as the amount of averaging is increased. One aspect of the present invention provides a method to choose the right combination of resolution and averaging so that the FFT is optimized for all flow conditions. This is accomplished by adjusting parameters used for calculating the temporal Fourier transform, the window duration D and the temporal frequency range, in response to the fluid 13 velocity or other fluid 13 parameter, determined by the analyzer 136.

Figure 5:
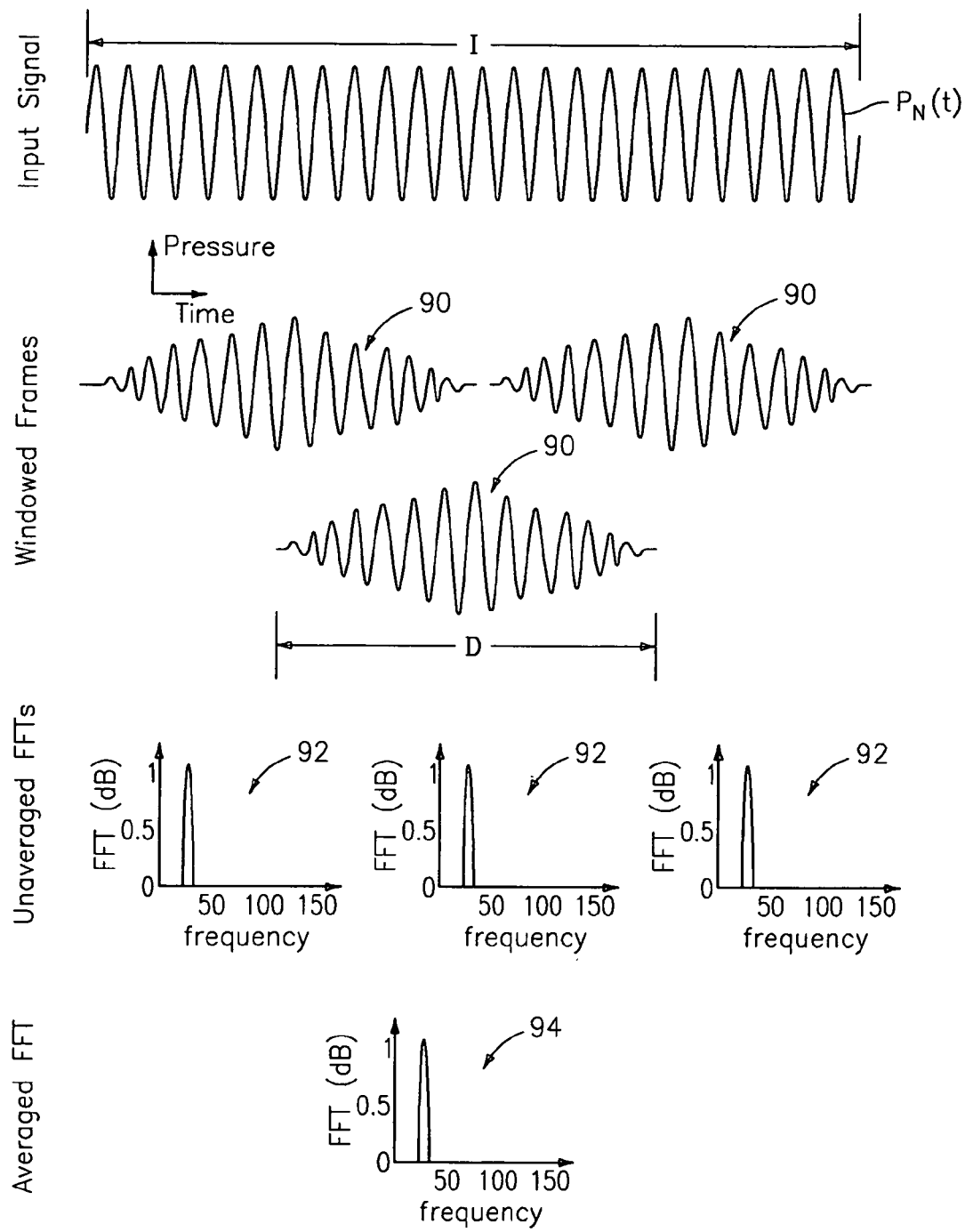
FIG. 5 depicts an example of a signal during different stages of processing by a fast Fourier transform (FFT) logic in the flow logic of FIG. 3.

More specifically, in the embodiment of FIG. 3, the time domain pressure signals $P_1(t) \ldots P_N(t)$ provided as input to the FFT logic 128 are each broken into shorter duration sections using a window length duration D and a known windowing function (e.g. Hamming, Hamming, Kaiser-Bessel, Tukey, Blackman, Bartlett, Square, or the like) at block 64. Each windowed section may be independent of each other or may be overlapping. For example, the top pane of FIG. 5 depicts an input signal $P_1(t)$, $P_2(t) \ldots$, or $P_N(t)$ from one sensor 15 (shown as a sinusoid for ease of description) as may be received by FFT logic 128. Below the input signal are shown three overlapping windowed sections 90 of duration D resulting from block 64. In the example of FIG. 5, a window overlap of about 50% is used. It is contemplated that the percentage overlap may be a user-input value.

In order to have sufficient resolution and so that coherent structures are seen by all sensors 15 along the array 11, the window must be of sufficient duration D so that a certain amount of fluid 13 flow has time to pass through the array 11 of sensors 15. The parameter that describes this is the array 11 aperture (indicated at 60 in FIG. 1) divided by the mean flow velocity:

$$\frac{\text{Aperture}}{u}$$

For an array 11 having evenly spaced sensors 15, this equation can be written as:

$$\frac{(N-1)\Delta x}{u}$$

where N is the number of sensors, $\Delta x$ is the sensor spacing in feet, and u is the mean flow velocity in feet/sec. The window duration D in seconds is then set proportional to this parameter (block 74):

$$D = C\frac{(N-1)\Delta x}{u}$$

where C is a constant. Experience indicates that C should be approximately 5 or greater.

If an analog signal processor 19 is used to calculate the FFT, the window duration D can be used as shown. It will be appreciated that the analog to digital conversion function (block 62) of data acquisition unit 126 is not needed when an analog signal processor 19 is used. However, when calculating the FFT with a digital signal processor 19 (DSP), such as a personal computer, digital application-specific integrated circuit, or other DSP, the number of discrete data points within each FFT should be a power of two (or as a minimum can be broken into small prime numbers) for computational efficiency. In this case, to meet the above window duration criteria while optimizing performance of the FFT algorithm, the data is digitized (block 62) and is sectioned as given by D above (rounding to the nearest integral data point) and the window function is applied (block 64). Then, the windowed section is zero-padded to a length equaling the next highest power of two (block 66) prior to calculating the FFT (block 68).

As an example, say an array 11 of eight sensors 15 spaced 2.4 inches apart is sampled at 4.096 kHz and is used to measure fluid 13 flow velocities between 3 and 30 ft/sec. The number of discrete data points in a windowed section is given as D*Fs where Fs is the sampling frequency in Hz. With C=5, at 3 ft/sec the number of points in one window is:

$$(5)\frac{(8-1)(2.4/12)}{3}4096 = 9557$$

the appropriate window function is then applied to each 9557 point section of the data (block 64). The windowed section is then zero-padded to contain 16384 points (the next power of two greater than 9557) (block 66) and the FFT is calculated (block 68).

Where fluid 13 flow velocity is calculated to be 30 ft/sec, the number of points in the window is:

$$(5)\frac{(8-1)(2.4/12)}{3}4096 = 956$$

In this case, the windowed section is zero-padded to contain 1024 points.

This method can also work by zero-padding the windowed section to the next highest value with prime factors greater than 2, say 3 or 4 (i.e. 1024*3=3072 which has prime factors of 2 and 3). An advantage of this variation is that the FFT efficiency is maintained since prime factors are small while requiring less zero padding.

After zero padding (block 66) the FFT calculation is performed to transform each windowed section into the frequency domain (block 68). The FFT calculation (block 68) transforms the time-domain data for each sensor 15 into a magnitude and phase of sinusoids at frequencies from the resolution limit to the Nyquist frequency. As shown in FIG. 5, for example, the FFT of the three windowed sections 90 results in one frequency spectrum 92 for each of the three windowed sections 90. However, the spectrum of the internal pressure field as measured by the array 11 does not contain meaningful information in every frequency bin. This is because the actual vortical spectrum is not completely broadband and (if using sensors 15 mounted externally on the pipe 14) "short" wavelength signals are attenuated due to the stiffness of the pipe 14 wall and finite sensor 15 width. Therefore, to maintain similarity across all possible mean flow velocities, a method to select which frequency bins that are used and which are discarded may be employed. In this method, maximum and minimum frequency limits ($f_{max}$ and $f_{min}$) are determined (block 76) in response to the mean flow velocity u calculated by the analyzer 136. The maximum and minimum frequency limits are then used to eliminate frequency bins containing no useful information (block 78). In other words, frequency bins outside the $f_{min}$ to $f_{max}$ range are discarded.

In block 76, the minimum and maximum frequency limits $f_{min}$ and $f_{max}$ are selected by holding a dimensionless parameter constant across the range of flow velocities. An appropriate dimensionless parameter is:

$$\frac{f\Delta x}{u}$$

where f is the frequency in Hz, Δx is the sensor 15 spacing in feet and u is the mean fluid velocity in feet/second.

For example, this parameter may be set to 0.3 for the low frequency limit and 0.7 for the high frequency limit. Thus, at 3 ft/sec for an array of sensors 15 spaced 2.4 inches apart, the frequency range is:

$$f_{MIN} = 0.3\frac{3}{(2.4/12)} = 4.5 \text{ Hz} \quad f_{MAX} = 0.7\frac{3}{(2.4/12)} = 10.5 \text{ Hz}$$

And at 30 ft/sec the frequency range used is:

$$f_{MIN} = 0.3\frac{30}{(2.4/12)} = 45 \text{ Hz} \quad f_{MAX} = 0.7\frac{30}{(2.4/12)} = 105 \text{ Hz}$$

There is a dispersion relationship between temporal and spatial frequency of a propagating wave:

$$\omega = ku$$

where k is the spatial frequency or wavenumber, and:

$$\lambda = \frac{2\pi}{k} = \frac{u}{f}$$

where λ is the wavelength

Due to this relationship, what the temporal frequency range selection routine described above is doing is forcing the algorithm to use a fixed range of wavelengths over the entire range of flow velocities, i.e. u/f=constant.

Since the wavelength of the vortical disturbances is proportional to the pipe diameter, the value used for $$\frac{f\Delta x}{u}$$

may also be adjusted inversely proportional to pipe diameter. For example, the values of 0.3 and 0.7 used in the example above may be appropriate for a 3 inch pipe, while values of 0.1 and 0.4 may be appropriate for a 30 inch pipe.

Turning now to block 70 of FIG. 3, after a predetermined number "M" of frequency spectra have been determined, the frequency spectra are averaged to provide an average frequency spectrum over the sampling interval (as shown for example at 94 in FIG. 5). This average frequency spectrum is then used as a flow velocity calculation point in the spatial correlation matrix (block 72).

The number M of frequency spectra required for each sampling interval may be determined as:

$$M = (W/(\% \text{ overlap})) - 1$$

where W is a used-defined integer equal to the desired number of independent (i.e. non-overlapping) windowed sections across the sampling interval, and % overlap is the percent overlap of the windowed sections. For example, in FIG. 5 the average frequency spectrum 94 over the sampling interval I is the result of user input values W=2, and about 50% overlap, which requires a total of M=3 frequency spectra 92.

While the above-described method for adjusting window duration D and temporal frequency range is described as being responsive to mean flow velocity u, it is contemplated that the above-described method may be responsive to other parameters 21 of the fluid 13. For example, U.S. patent application Ser. No. 09/344,094, filed Jun. 25, 1999, now U.S. Pat. No. 6,354,147, describes a method and apparatus wherein a spatial array of pressure sensors provide acoustic pressure signals to a signal processing logic, which determines the speed of sound of a fluid in a pipe using acoustic spatial array signal processing techniques. Similar to the flow logic 36 described herein, the signal processing logic described in the '147 patent receives time-varying signals from the array of pressure sensors and applies the time-varying signals to FFT logic. It is contemplated that the speed of sound parameter may be used to adjust window duration D and temporal frequency range in a manner similar to that described herein for flow mean flow velocity u.

After the data accumulator 130 accumulates the frequency signals $P_1(\omega), \ldots P_N(\omega)$ over a sampling internal, this data is used by the array processor 132 to calculate the power in the k-ω plane, as represented by a k-ω plot (see FIG. 4). As previously discussed, there are numerous algorithms available in the public domain to perform the spatial/temporal decomposition of arrays of sensors 15.

Once the power in the k-ω plane is determined, the convective ridge identifier 134 uses one or another feature extraction method to determine the location and orientation (slope) of any convective ridge 124 (FIG. 4) present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

One feature extraction method to identify the convective ridge has been found to provide excellent results. This method relies on the use of a 'power function', which is obtained by summing the k-omega power obtained from the Capon analysis along each potential vortical ridge for a series of vortical speeds. This analysis results in a power function, an example of which is given in FIG. 6.

Theoretically, the most accurate vortical velocity is represented by the peak of the curve. However, just finding the peak of the function may not represent the most accurate value in a real-world system. Variances in instantaneous vortical velocity and other system noise can distort the shape of the peak, potentially causing a more flat-topped function that has several peaks. In this situation a simple peak find method will produce erratic and noisy results. Several alternative techniques can be used to determine the ridge central location including curve fitting and center-of-mass or centroid techniques.

Centroid techniques can be powerful, however the results will depend heavily on the calculation width and other parameters which are used for the calculations. In this case many different variables will affect the overall shape of the ridge, inducing potentially non-symmetric shapes. If the centroid were performed on the full function shown in FIG. 6, for example, the number derived would be biased to the left, giving an incorrect result. To correct for this error two techniques are proposed: 1) only the top portion of the ridge will be used for determination of the ridge center, and 2) the power will be calculated on a linear scale, thereby emphasizing the strong components and minimizing the effects of the weak.

Figure 7:
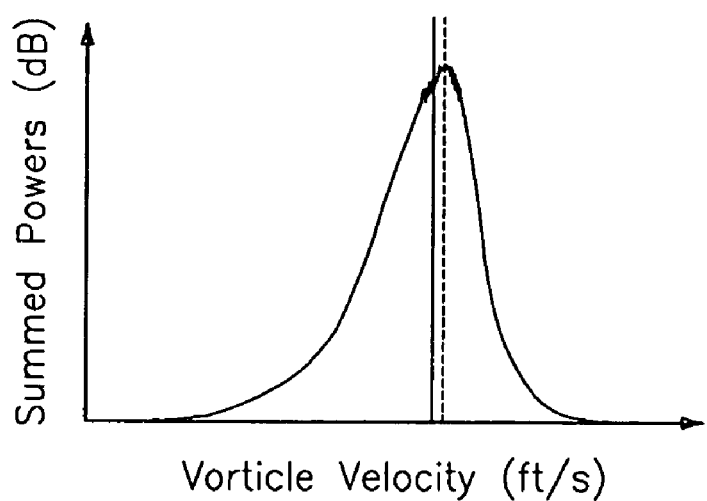
FIG. 7 shows the results of a calculation of a ridge centroid of the power function of FIG. 6 based on the total power.

FIG. 7 shows a calculation of the ridge centroid based on the total power (dark line) and calculated using only the top several dB of the power (light line). As can be seen, the light centroid gives a more accurate determination of the peak of the function, and will still exhibit the benefits of the centroid such as increased immunity to signal noise and irregular shapes.

Figure 8:
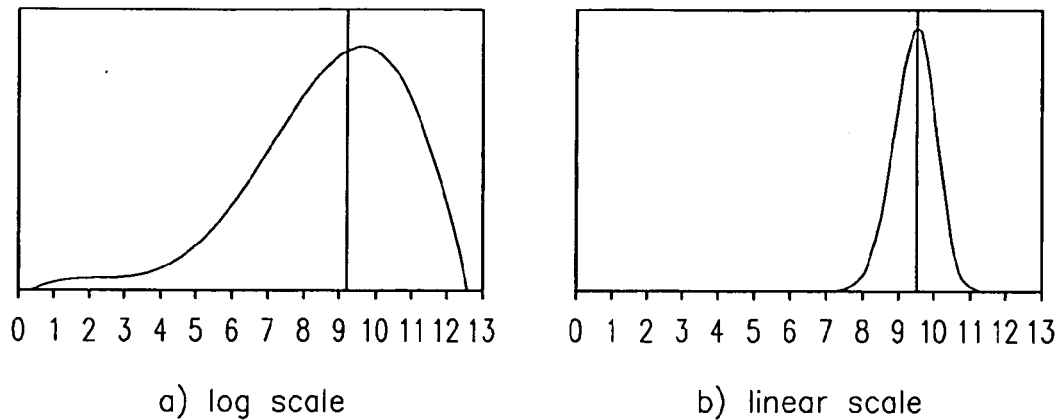
FIG. 8 depicts the function of FIG. 6 plotted on both a log and linear vertical scale.

The second approach effectively implements the first technique in a more efficient manner. FIG. 8 demonstrates the same function plotted on both a log and linear vertical scale. As seen the evaluation of the centroid on the linear function (as denoted by the vertical line) gives a much more accurate representation of the function peak than the log scale number. This is due to the natural increased weighting of the high value terms in the linear function.

Figure 9:
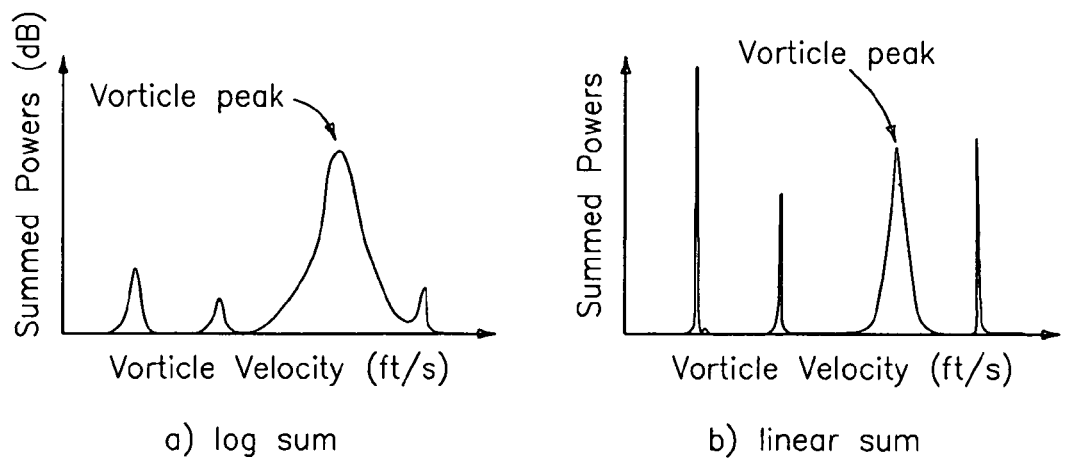
FIG. 9 depicts a power function plotted on both a log and linear vertical scale where isolated high intensity frequency components are present.

The straight linear approach however can lead to incorrect results when used in real-world applications that have significant amounts of noise. In particular, when isolated high intensity frequency components are present in the sensor signals this will produce spikes that can be mistaken for the vortical peak. FIG. 9 illustrates the potential problem.

The power function is produced by summing the MVDR calculated power along a potential vortical ridge. A sum of the linear powers can produce a function as shown in FIG. 8b). Here a series of peaks are seen with several very narrow peaks that are produced by isolated areas of frequency noise in the sensor data. As seen, these noise spikes can have larger peak power than the vortical ridge but have a very narrow bandwidth. A peak detection algorithm would be confused by the noise peaks and may not determine the correct vortical peak. However, as shown in FIG. 9a), when the summed power consists of a sum of the log powers the vortical ridge is clearly differentiated from the noise spikes.

Therefore, to provide a very accurate peak determination a two step approach is warranted. The first stage consists of a power function produced by summing the log power components (similar to FIG. 9a). Once the vortical ridge is identified, a centroid calculation can be performed using the sum of linear powers as demonstrated in FIG. 8b). The centroid would only be performed around the vortical ridge and would not contain the extraneous noise spikes.

Alternatively, the first stage consists of a power function produced by summing the log power components (similar to FIG. 9a). Once the vortical ridge is identified, a centroid calculation can be performed using the sum of log powers as demonstrated in FIG. 7).

As previously discussed, the flow meter of the present invention uses known array processing techniques, in particular the MVDR or Capon technique, to identify pressure fluctuations, which convect with the materials flowing in a conduit and accurately ascertain the velocity, and thus the flow rate, of said material. Unfortunately, these techniques inherently may not do more than provide an estimate for the constant speed which best fits the data provided by the pressure sensors 15. That is, the processing will return the speed or velocity of the flow 18 that produces the largest power when it is matched to the data, regardless as to whether that power is produced by 1) convecting pressure variations (the desired result), 2) acoustic signals in the flowing medium, conduit or surrounding atmosphere, 3) electrical pick up by the sensors or associated cables and electronics or 4) other unwanted signals including but not limited to electronic and digitizing noise. Therefore, a method to analyze the output of the signal processor 19 is provided to ensure that the flow meter 10 does not report a flow velocity u, flow rate, or other output parameter when the quality of the measurement is poor, or in the event that there is in fact no flow of the fluid 13. This aspect of the invention provides methods by which the quality of the flow meter measurement can be determined and this quality be used to gate the output of the flow meter in the event of low confidence in the measurement and/or no flow conditions, as employed by the quality factor comparator 138 of FIG. 3.

The quality factor comparator 138 uses a simple yet powerful technique to determine whether the convective ridge identifier 134 has found a true convecting ridge 124 (FIG. 4) or random maximum value in the system's noise. This technique uses the value of the power along the convective ridge 124 calculated for the speed of the flowing fluid 13 and compares it to the power found by a velocity estimator beam looking for fluid flow in the opposite direction or mirror side of the k-ω plane, where no flow or convective ridge is expected to be present. The ratio of the power along the calculated ridge 124 and the power of the mirror convective ridge in the opposite direction (or other half of the k-ω plane as shown at 124' in FIG. 4) will be large when a true ridge 124 has been found and power in its mirror ridge 124' is comprised solely of low level noise inputs (i.e., no mirror convective ridge is present). Therefore, a high quality factor is close to 1, and a low quality factor is close to 0.

Determining a cut off (pass/fail) quality value for this ratio is problematic in many cases as the power calculated along the proper ridge 124 will be influenced by the signals sizes, the coherence of the signals along the sensor array 11 and other factors and the power of the mirror (noise) ridge 124' is similarly affected by multiple factors. To obtain a normalized ratio, the power calculated along the mirror ridge 124' is subtracted from that calculated for the convecting ridge 124 and this difference is divided by the sum the convecting ridge power 124 plus the power along the mirror ridge 124'. In the ideal case where the noise plane has a power of zero, this ratio will yield a value of unity (1). In real world applications, this ratio will yield values less than 1 which will approach zero (0) when there exists no true convecting signal and convecting ridge 124 and its mirror 124' are actually local maxima in a noise plane.

It is important to note that if the apparatus 10 is installed backwards or the fluid 13 is flowing in a direction opposite from that expected, this ratio will yield a value near minus one (−1) for a high quality factor.

In one method of determining the quality factor, only one half of the k-ω plane is scanned or analyzed to find and determine the power of the convective ridge 124. The mirror side of the k-ω plane is then only scanned along the mirror (or complementary) convective ridge 124' to determine its power. Using this method, it is unlikely that a negative flow condition (e.g., apparatus 10 put on backwards or direction of fluid flow 13 changed) would be determined (indicated by a negative quality factor) because it is improbable that a convective ridge formed of noise (or non-vortical pressure disturbances) would be found along the same convective ridge in the mirror side of the k-ω plane, which is indicative of a flow in the opposite direction.

To increase the likelihood of determining a negative quality factor and hence a negative flow, if a low quality factor is determined, the mirror side of k-ω plane can be scanned or analyzed to find and determine the power of a mirror convective ridge. The other side of the k-ω plane is then only scanned along the convective ridge to determine its power. The two ridges are then compared as described hereinbefore and a quality factor associated with flow in the opposite direction is then determined. Alternatively, the power of the mirror convective ridge may be simply compared with the convective ridge formed of noise. This eliminates the repeat scanning of the other side of the convective ridge a second time.

A low quality factor is indicative of no flow condition, low flow condition or a flow propagating in the opposite direction. When only one half of the k-ω plane is scanned or analyzed to find the convective ridge 22 to determine the velocity of the flow 18, the likelihood of the meter determining whether the flow is in the opposite direction (quality factor between 0 and −1) is low.

The quality factor employed by the quality factor comparator 138, (the ratio of the calculated ridge 124 minus its mirror 124' to the sum of the two ridges), yields values between minus one and one. Through multiple laboratory tests and systems trials in multiple processing plants, it has been determined that quality factors greater than 0.2 provide a robust gate for determining when the apparatus 10 has found a real convecting ridge 124, and thus a valid measure of the flow rate for the fluid 13. It should be noted that this value of 0.2 can easily be modified upward or downward to reflect the particular dynamics of any given flow meter installation.

Another quality metric that may be used by the quality factor comparator takes the ratio of the summed powers along the calculated vorticle ridge 124, $P_v$, to the summed powers along the negative of the calculated vorticle ridge 124', $P_{-v}$. If this ratio is near or below 0 then the quality is bad for that particular measurement. This means that the summed power along the vorticle ridge 124 of the calculated flow rate is equal or less to the ridge 124' in the opposite direction. However, the final number derived from this simple ratio can vary greatly independent of the measurement quality, but depending on the system noise and signal strengths of the individual sensors. One way to bound the range of the quality factor and normalize the reading is to use this equation:

$$Q = \frac{P_v - P_{-v}}{P_v + P_{-v}} \quad \text{(Equation 1)}$$

where Q is the final quality. This will bound the quality metric to between 1 and −1, with 1 representing the highest quality signal.

Figure 6:
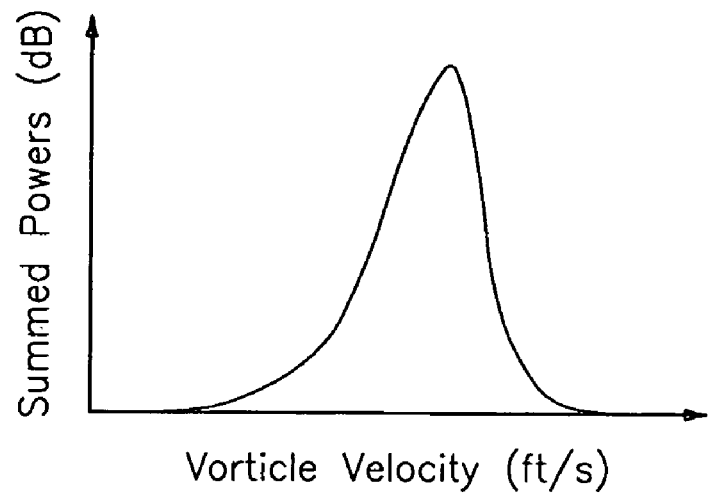
FIG. 6 depicts a power function obtained by summing k-ω power obtained from a Capon analysis along each potential vertical ridge for a series of vertical speeds.

In addition to the above quality metric, other parameters of the capon algorithm can be used to give a more accurate and detailed quality factor. For example, this analysis may employ the use of a 'power function', which is obtained by summing the k-omega power obtained from the capon analysis along each potential vorticle ridge for a series of vorticle speeds. An example of a power function is shown in FIG. 6.

The power function contains relative integrated powers for correlated vorticle signals across a potential range of speeds. The peak represents the most probable vorticle ridge location by giving the highest correlated vorticle pressures. However the shape of this peak gives crucial information on the robustness of the ridge; a delta function indicates a very strong ridge that is clearly defined, while an extremely weak peak may indicate no real vorticle information.

Figure 10:
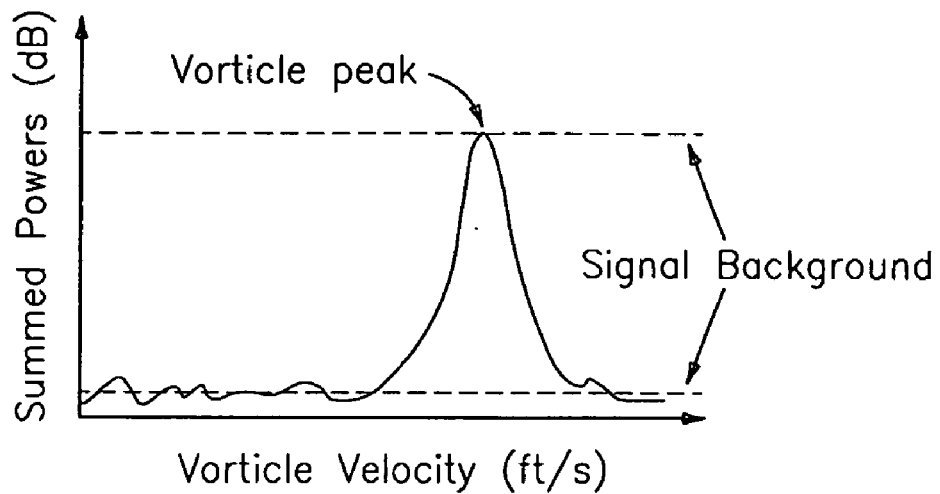
FIG. 10 depicts a signal to background comparison of the power function of FIG. 6.

FIG. 10 demonstrates a simple signal to background calculation that will give a very good indication of the strength of the vorticle ridge. As shown FIG. 10 the average background signal is used for a relative base level for the peak. This will give an indication of the vorticle peak relative to overall system noise across the whole operating velocity space. However, an alternative would take the height of the vorticle peak relative to the next highest peak. In very noisy or high vibration environments, extra peaks can be created which do not reflect the speed of flow in the pipe. A measurement relative to these would indicate the quality of the flow measurement and the headroom for each measurement. An absolute measure or a normalized number using equation 1 above could then be used in a simple threshold system to indicate a good flow measurement or an unreliable measurement.

Figure 11:
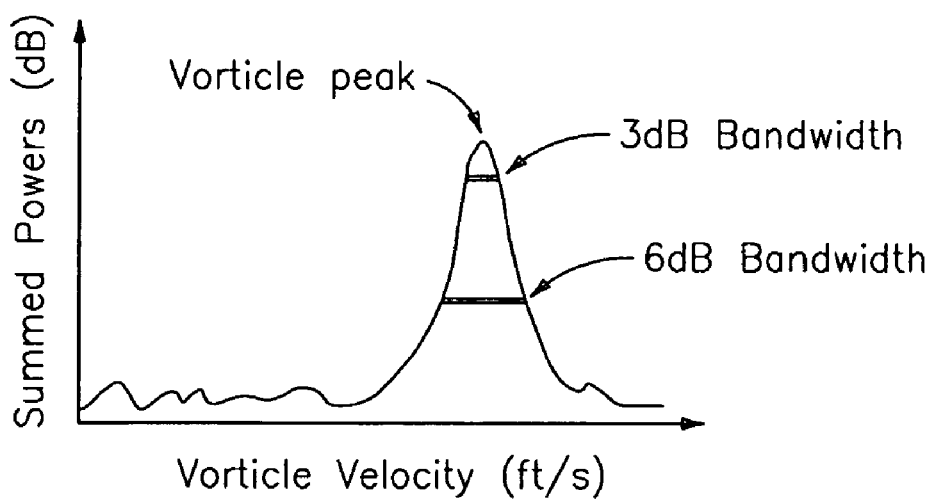
FIG. 11 depicts two bandwidth measurements (3 dB and 6 dB) taken along the power function of FIG. 6.

Several more characteristics of the peak can be used to indicate additional information on the health of the flow measurement. An example of this would be the bandwidth of the vorticle peak. FIG. 11 shows two typical bandwidth measurements (3 and 6 dB) that would give a good indication of the overall shape of the peak. The shape of the peak can depend on several variables, a couple of which include: the strength of the vorticle signals relative to the other environmental noise as well as the consistent nature of the flow during the measurement sample. Again, by utilizing equation 1 above to normalize the output, these two measurements can be used to determine a high accuracy flow measurement from an unreliable one.

Figure 12:
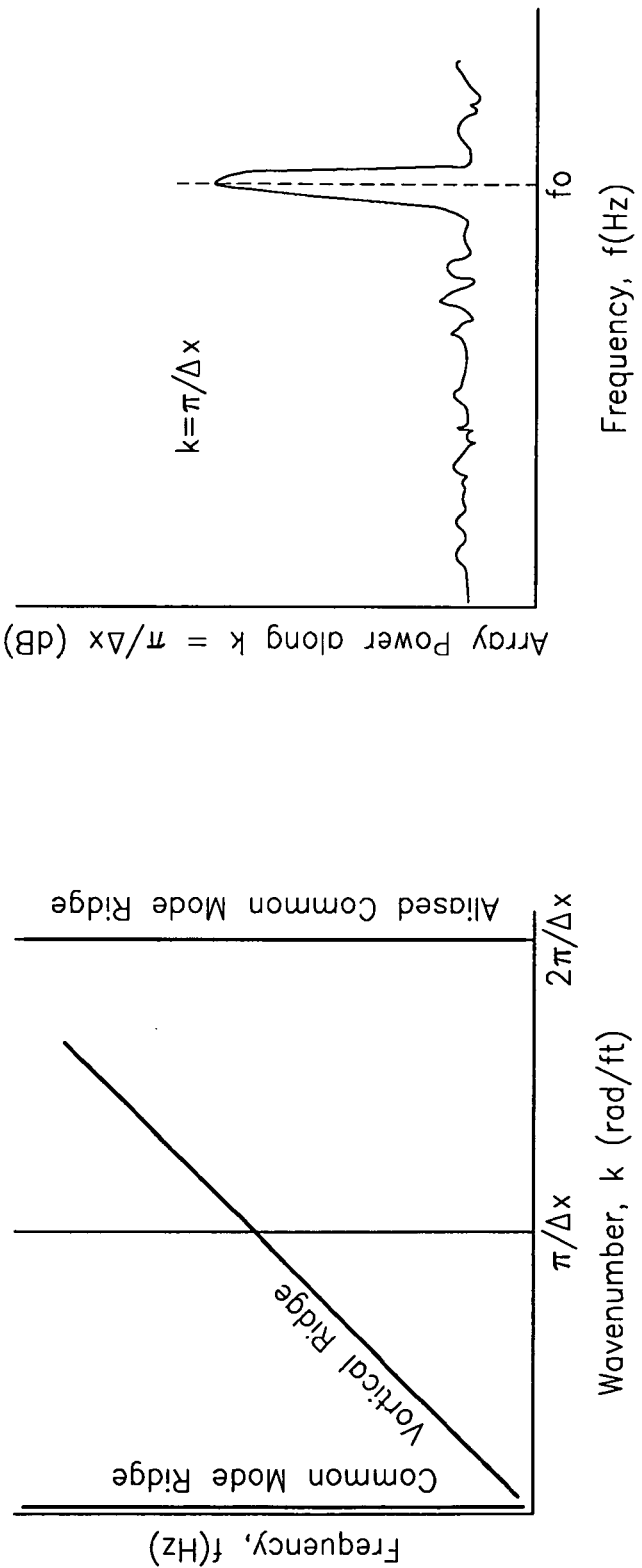
FIG. 12 depicts a the relationship of a line of constant wavenumber with a vortical ridge and common mode ridges, and the result of calculating array power using a constant wavenumber.

The above-described methods for adjusting window duration D and temporal frequency range in response to a parameter 21 of the fluid 13 work well once array data has been processed and the analyzer 136 has calculated mean flow velocity u. However, upon start up of the signal processor 36, several input parameters, including window duration D and temporal frequency range ($f_{min}$ and $f_{max}$), must be set prior to processing the array data. In one aspect of the present invention, values for these parameters re determined using the array 11 sensor spacing and the velocity of the desired measurement. More specifically, an initialization routine determines the frequency of the maximum power at a constant wavenumber equal to $\pi/\Delta x$ or some other value that may also increase or decrease with pipe diameter, as indicated in FIG. 12. Through the dispersion relationship, the velocity can be determined:

$$u = \frac{2\pi f}{k} = 2f\Delta x$$

where u is the velocity in ft/sec, f is the frequency in Hz, k is the wavenumber rad/ft and $\Delta x$ is the sensor spacing in feet.

The power is calculated using the standard MVDR algorithm, except rather than processing over the entire k-ω plane, the processing is done by varying frequency at constant wavenumber (i.e. along a line of constant wavenumber).

There are several benefits to this method. First, the entire range of temporal frequencies can be searched with significantly less processing than searching the entire k-ω plane. Second the line of constant wavenumber equal to $\pi/\Delta x$ is parallel to the line of common mode signals at wavenumber equal to 0. Since the common mode will alias at wavenumber equal to $2\pi/\Delta x$, the line of wavenumber equal to $\pi/\Delta x$ has the most separation from and therefore will have the least interference from any common mode signal or its aliases. Finally, one method used to eliminate common mode signal as much as possible is to difference adjacent sensors. When this is done an array gain is introduced that is maximum at wavenumber equal to $\pi/\Delta x$. Therefore choosing wavenumber equal to $\pi/\Delta x$ has the advantage that the gain of the vortical signal of interest is at a maximum.

Note that with clamp-on sensors (e.g. PVDF strips), that measure internal pressure fluctuations by measuring the strain on the outside diameter of the pipe, signals with a high wavenumber (small wavelength) will be attenuated due to the stiffness of the pipe wall. This will skew the array gain function to a wavenumber equal to something less than $\pi/\Delta x$. Therefore there may be cases where the optimum wavenumber to apply this methodology to something other than $\pi/\Delta x$ so the present embodiment is not limited to the choice of wavenumber equal to $\pi/\Delta x$.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring a flow parameter of a fluid passing through a pipe, the apparatus comprising:
  a spatial array of at least two sensors disposed at different axial locations along the pipe, each of the sensors providing a time-domain signal indicative of a sensed parameter of the fluid at a corresponding axial location of the pipe; and
  a signal processor configured to:
    divide the time-domain signal from each sensor into at least on windowed sections using a window of duration D,
    transform the at least one windowed section into at least one frequency spectrum,
    transform the signal indicative of the frequency spectrum into the k-ω domain,
    determine a slope of at least one ridge in the k-ω plane,
    determine a determined parameter of the fluid using the slope of the at least one ridge, and
    adjust the duration D of the window in response to the determined parameter.

2. The apparatus of claim 1, wherein the duration D is determined as a function of an aperture length of the spatial array of at least two sensors.

3. The apparatus of claim 2, wherein the duration D is determined as:

$$D=C(\text{Aperture})/u$$

where C is a constant, Aperture is the aperture length of the spatial array, and u is a mean flow velocity of the fluid.

4. The apparatus of claim 1, wherein the signal processor is further configured to:
  adjust a temporal frequency range of the at least one frequency spectrum in response to the parameter.

5. The apparatus of claim 4, wherein the maximum and minimum frequency limits defining the temporal frequency range are determined as:

$$f_{min}=C_{min}u/\Delta x$$

$$f_{max}=C_{max}u/\Delta x$$

wherein $f_{min}$ and $f_{max}$ are the maximum and minimum frequency limits, respectively, Cmin and Cmax are constants, and $\Delta x$ is a spacing between sensors in the spatial array.

6. The apparatus of claim 1, wherein the flow parameter of the fluid includes at least one of: velocity of the fluid, density of the fluid, volumetric flow rate of the fluid, mass flow rate of the fluid, composition of the fluid, entrained air in the fluid, consistency of the fluid, and size of particles in the fluid.

7. The apparatus of claim 1 wherein the at least two sensors are selected from a group consisting of: pressure, piezoelectric, piezoresistive, strain gauge, PVDF, optical sensors, ported ac pressure sensors, accelerometers, velocity sensors, and displacement sensors.

8. The apparatus of claim 1, wherein the at least two sensors are pressure sensors wrapped around at least a portion of the pipe and do not contact the fluid.

9. An apparatus for measuring a flow parameter of a fluid passing through a pipe, the apparatus comprising:
  a spatial array of at least two sensors disposed at different axial locations along the pipe, each of the sensors providing a time-domain signal indicative of a sensed parameter of the fluid at a corresponding axial location of the pipe; and
  a signal processor configured to:
    divide the time-domain signal from each sensor into at least one windowed sections using a window of duration D,
    transform the at least one windowed section into at least one frequency spectrum,
    transform the signal indicative of the frequency spectrum into the k-ω domain,
    determine a slope of at least one ridge in the k-ω plane,
    determine a determined parameter of the fluid using the slope of the at least one ridge, and
    adjust a temporal frequency range of the at least one frequency spectrum in response to the determined parameter.

10. The apparatus of claim 9, wherein the maximum and minimum frequency limits defining the temporal frequency range are determined as:

$$f_{min}=C_{min}u/\Delta x$$

$$f_{max}=C_{max}u/\Delta x$$

wherein $f_{min}$ and $f_{max}$ are the maximum and minimum frequency limits, respectively, Cmin and Cmax are constants, and $\Delta x$ is a spacing between sensors in the spatial array.

11. The apparatus of claim 9, wherein the flow parameter of the fluid includes at least one of: velocity of the fluid, density of the fluid, volumetric flow rate of the fluid, mass flow rate of the fluid, composition of the fluid, entrained air in the fluid, consistency of the fluid, and size of particles in the fluid.

12. The apparatus of claim 9 wherein the at least two sensors are selected from a group consisting of: pressure, piezoelectric, piezoresistive, strain gauge, PVDF, optical sensors, ported ac pressure sensors, accelerometers, velocity sensors, and displacement sensors.

13. The apparatus of claim 9, wherein the at least two sensors are pressure sensors wrapped around at least a portion of the pipe and do not contact the fluid.

14. A method for measuring a flow parameter of a fluid passing through a pipe using a spatial array of at least two sensors disposed at different axial locations along the pipe, each of the sensors providing a time-domain signal indicative of a sensed parameter of the fluid at a corresponding axial location of the pipe, the method comprising:
dividing the time-domain signal from each sensor into at least one windowed section using a window of duration D,
transforming the at least one windowed section into at least one frequency spectrum,
transforming the signal indicative of the frequency spectrum into the k-ω domain,
determining a slope of at least one ridge in the k-ω plane,
determining a determined parameter of the fluid using the slope of the at least one ridge, and
adjusting the duration D of the window in response to the determined parameter.

15. The method of claim 14, wherein the duration D is determined as a function of an aperture length of the spatial array of at least two sensors.

16. The method of claim 15, wherein the duration D is determined as:

$$D=C(\text{Aperture})/u$$

where C is a constant, Aperture is the aperture length of the spatial array, and u is a mean flow velocity of the fluid.

17. The method of claim 14, wherein the signal processor is further configured to:
adjust a temporal frequency range of the at least one frequency spectrum in response to the parameter.

18. The method of claim 17, wherein the maximum and minimum frequency limits defining the temporal frequency range are determined as:

$$f_{min}=C_{min}u/\Delta x$$

$$f_{max}=C_{max}u/\Delta x$$

wherein $f_{min}$ and $f_{max}$ are the maximum and minimum frequency limits, respectively, Cmin and Cmax are constants, and $\Delta x$ is a spacing between sensors in the spatial array.

19. The method of claim 14, wherein the flow parameter of the fluid includes at least one of: velocity of the fluid, density of the fluid, volumetric flow rate of the fluid, mass flow rate of the fluid, composition of the fluid, entrained air in the fluid, consistency of the fluid, and size of particles in the fluid.

20. An method for measuring a flow parameter of a fluid passing through a pipe using a spatial array of at least two sensors disposed at different axial locations along the pipe, each of the sensors providing a time-domain signal indicative of a sensed parameter of the fluid at a corresponding axial location of the pipe, the apparatus comprising:
dividing the time-domain signal from each sensor into at least one windowed section using a window of duration D,
transforming the at least one windowed section into at least one frequency spectrum,
transforming the signal indicative of the frequency spectrum into the k-ω domain,
determining a slope of at least one ridge in the k-ω plane,
determining a determined parameter of the fluid using the slope of the at least one ridge, and
adjusting a temporal frequency range of the plurality of frequency spectra in response to the determined parameter.

21. The method of claim 20, wherein the maximum and minimum frequency limits defining the temporal frequency range are determined as:

$$f_{min}=C_{min}u/\Delta x$$

$$f_{max}=C_{max}u/\Delta x$$

wherein $f_{min}$ and $f_{max}$ are the maximum and minimum frequency limits, respectively, Cmin and Cmax are constants, and $\Delta x$ is a spacing between sensors in the spatial array.

22. The method of claim 20, wherein the flow parameter of the fluid includes at least one of: velocity of the fluid, density of the fluid, volumetric flow rate of the fluid, mass flow rate of the fluid, composition of the fluid, entrained air in the fluid, consistency of the fluid, and size of particles in the fluid.

23. A storage medium encoded with machine-readable computer program code for measuring a flow parameter of a fluid passing through a pipe using a spatial array of at least two sensors disposed at different axial locations along the pipe, each of the sensors providing a time-domain signal indicative of a sensed parameter of the fluid at a corresponding axial location of the pipe, the storage medium including instructions for causing a computer to implement a method comprising:
dividing the time-domain signal from each sensor into at least one windowed section using a window of duration D,
transforming the at least one windowed section into at least one frequency spectrum,
transforming the signal indicative of the frequency spectrum into the k-ω domain,
determining a slope of at least one ridge in the k-ω plane,
determining a determined parameter of the fluid using the slope of the at least one ridge, and
adjusting the duration D of the window in response to the determined parameter.

24. A storage medium encoded with machine-readable computer program code for measuring a flow parameter of a fluid passing through a pipe using a spatial array of at least two sensors disposed at different axial locations along the pipe, each of the sensors providing a time-domain signal indicative of a sensed parameter of the fluid at a corresponding axial location of the pipe, the storage medium including instructions for causing a computer to implement a method comprising:

dividing the time-domain signal from each sensor into at least one windowed section using a window of duration D, transforming the at least one windowed section into at least one frequency spectrum, transforming the signal indicative of the frequency spectrum into the k-ω domain, determining a slope of at least one ridge in the k-ω plane, determining a determined parameter of the fluid using the slope of the at least one ridge, and adjusting a temporal frequency range of the plurality of frequency spectra in response to the determined parameter.

25. The apparatus of claim 1, wherein the signal processor is configured to:
divide the time-domain signal from each sensor into a plurality of windowed sections using a window of duration D;
transform the plurality of windowed section into a plurality of frequency spectra;
average the plurality of frequency spectra to provide a signal indicative of the frequency spectrum of at least a portion of the time-domain signal; and,
transform the signal indicative of the frequency spectra into the k-ω domain.

26. The apparatus of claim 1, wherein the sensed parameter is unsteady pressure which includes pressure disturbances propagating with the fluid and/or acoustic pressure disturbances propagating through the fluid.

27. The apparatus of claim 1, wherein the spatial array includes at least 3, 4, 5, 6, 7, 8, 9, 10, 11, 12, 13, 14, 15, or 16 sensors.

28. The apparatus of claim 9, wherein the duration D is determined as a function of an aperture length of the spatial array of at least two sensors.

29. The apparatus of claim 28, wherein the duration D is determined as:

$$D = C(\text{Aperture})/u$$

where C is a constant, Aperture is the aperture length of the spatial array, and u is a means flow velocity of the fluid.

30. The apparatus of claim 9, wherein the signal processor is configured to:
divide the time-domain signal from each sensor into a plurality of windowed sections using a window of duration D; and
transform the plurality of windowed section into a plurality of frequency spectra;
average the plurality of frequency spectra to provide a signal indicative of the frequency spectrum of at least a portion of the time-domain signal; and,
transform the signal indicative of the frequency spectra into the k-ω domain.

31. The apparatus of claim 1, wherein the sensed parameter is unsteady pressure which includes pressure disturbances propagating with the fluid and/or acoustic pressure disturbances propagating through the fluid.

32. The apparatus of claim 1, wherein the spatial array includes at least 3, 4, 5, 6, 7, 8, 9, 10, 11, 12, 13, 14, 15, or 16 sensors.

33. The method of claim 14, wherein the signal processor is configured to:
divide the time-domain signal from each sensor into a plurality of windowed sections using a window of duration D; and
transform the plurality of windowed section into a plurality of frequency spectra;
average the plurality of frequency spectra to provide a signal indicative of the frequency spectrum of at least a portion of the time-domain signal; and,
transform the signal indicative of the frequency spectra into the k-ω domain.

34. The method of claim 1, wherein the sensed parameter is unsteady pressure which includes pressure disturbances propagating with the fluid and/or acoustic pressure disturbances propagating through the fluid.

35. The method of claim 1, wherein the spatial array includes at least 3, 4, 5, 6, 7, 8, 9, 10, 11, 12, 13, 14, 15, or 16 sensors.

36. The method of claim 14 wherein the at least two sensors are selected from a group consisting of: pressure, piezoelectric, piezoresistive, strain gauge, PVDF, optical sensors, ported ac pressure sensors, accelerometers, velocity sensors, and displacement sensors.

37. The method of claim 20, wherein the duration D is determined at a function of an aperture length of the spatial array of at least two sensors.

38. The method of claim 37, wherein the duration D is determined as:

$$D = C(\text{Aperture})/u$$

where C is a constant, Aperture is the aperture length of the spatial array, and u is a mean flow velocity of the fluid.

39. The method of claim 20, wherein the signal processor is configured to:
divide the time-domain signal from each sensor into a plurality of windowed sections using a window of duration D; and
transform the plurality of windowed section into a plurality of frequency spectra;
average the plurality of frequency spectra to provide a signal indicative of the frequency spectrum of at least a portion of the time-domain signal; and,
transform the signal indicative of the frequency spectra into the k-ω domain.

40. The method of claim 1, wherein the sensed parameter is unsteady pressure which includes pressure disturbances propagating with the fluid and/or acoustic pressure disturbances propagating through the fluid.

41. The method of claim 1, wherein the spatial array includes at least 3, 4, 5, 6, 7, 8, 9, 10, 11, 12, 13, 14, 15, or 16 sensors.

42. The method of claim 20 wherein the at least two sensors are selected from a group consisting of: pressure, piezoelectric, piezoresistive, strain gauge, PVDF, optical sensors, ported ac pressure sensors, accelerometers, velocity sensors, and displacement sensors.

43. The method of claim 23, wherein the signal processor is configured to:
divide the time-domain signal from each sensor into a plurality of windowed sections using a window of duration D; and
transform the plurality of windowed section into a plurality of frequency spectra;

average the plurality of frequency spectra to provide a signal indicative of the frequency spectrum of at least a portion of the time-domain signal; and, transform the signal indicative of the frequency spectra into the k-ω domain.

44. The storage medium of claim 23, wherein the sensed parameter is unsteady pressure which includes pressure disturbances propagating with the fluid and/or acoustic pressure disturbances propagating through the fluid.

45. The method of claim 24, wherein the signal processor is configured to:

divide the time-domain signal from each sensor into a plurality of windowed sections using a window of duration D; and transform the plurality of windowed section into a plurality of frequency spectra;

average the plurality of frequency spectra to provide a signal indicative of the frequency spectrum of at least a portion of the time-domain signal; and, transform the signal indicative of the frequency spectra into the k-ω domain.

46. The storage medium of claim 23, wherein the sensed parameter is unsteady pressure which includes pressure disturbances propagating with the fluid and/or acoustic pressure disturbances propagating through the fluid.

* * * * *